US011170753B2

(12) United States Patent
Nomura et al.

(10) Patent No.: US 11,170,753 B2
(45) Date of Patent: Nov. 9, 2021

(54) INFORMATION PROCESSING METHOD, INFORMATION PROCESSING DEVICE, AND COMPUTER-READABLE RECORDING MEDIUM RECORDING INFORMATION PROCESSING PROGRAM

(71) Applicant: Panasonic Intellectual Property Corporation of America, Torrance, CA (US)

(72) Inventors: Kazuya Nomura, Osaka (JP); Tomomi Matsuoka, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 140 days.

(21) Appl. No.: 16/589,477

(22) Filed: Oct. 1, 2019

(65) Prior Publication Data

US 2020/0118540 A1 Apr. 16, 2020

(30) Foreign Application Priority Data

Oct. 10, 2018 (JP) .............................. JP2018-191600

(51) Int. Cl.
  *G10L 13/00* (2006.01)
  *G10L 15/22* (2006.01)
  *G06F 3/01* (2006.01)
  *G10L 13/027* (2013.01)

(52) U.S. Cl.
  CPC .............. *G10L 13/00* (2013.01); *G06F 3/011* (2013.01); *G10L 13/027* (2013.01); *G10L 15/22* (2013.01); *G10L 2015/227* (2013.01)

(58) Field of Classification Search
  CPC . G06F 3/16; G06F 3/167; G06F 9/542; G10L 15/22
  See application file for complete search history.

(56) References Cited

U.S. PATENT DOCUMENTS

| 9,319,843 | B2* | 4/2016 | Lerenc | ................ | H04W 4/027 |
| 2004/0019603 | A1* | 1/2004 | Haigh | ................ | G06Q 10/109 |
| 2010/0286490 | A1* | 11/2010 | Koverzin | ............... | G16H 40/67 |
| | | | | | 600/301 |
| 2012/0265535 | A1* | 10/2012 | Bryant-Rich | ........... | G06F 3/167 |
| | | | | | 704/270 |
| 2016/0335139 | A1* | 11/2016 | Hurley | ................ | G06F 3/04842 |
| 2017/0357395 | A1* | 12/2017 | Hurley | ................ | G06F 3/04842 |
| 2018/0182229 | A1* | 6/2018 | Gao | ........................ | G08B 21/24 |

FOREIGN PATENT DOCUMENTS

JP 2007-213315 8/2007

* cited by examiner

*Primary Examiner* — Daniel Abebe
(74) *Attorney, Agent, or Firm* — Wenderoth, Lind & Ponack, L.L.P.

(57) ABSTRACT

An action notification device acquires uttered voice data indicating an action of a user and being uttered by the user; detects a moving motion of the user; detects a stationary motion of the user; determines whether a predetermined time has elapsed in a state where the user is stationary; and notifies the user of contents of the action of the user based on the uttered voice data when it is determined that the predetermined time has elapsed in the state where the user is stationary.

9 Claims, 11 Drawing Sheets

INFORMATION PROCESSING METHOD, INFORMATION PROCESSING DEVICE, AND COMPUTER-READABLE RECORDING MEDIUM RECORDING INFORMATION PROCESSING PROGRAM

FIELD OF THE INVENTION

The present disclosure relates to an information processing method, an information processing device, and a non-transitory computer-readable recording medium recording an information processing program that notify a user of an action the user has forgotten.

BACKGROUND ART

When a person comes up with an action for attaining an objective and tries to perform the action, the person may forget in a short time what action the person has come up with and may eventually fail to attain the objective.

For example, JP 2007-213315 A discloses a life assisting device including an action pattern input unit for inputting an action pattern; a storage unit for storing a plurality of sets of action patterns that are input into the action pattern input unit and input times of the action patterns; a voice input unit for inputting a keyword related to any of the action pattern and the input time by a voice; a voice recognition unit for analyzing the voice that is input from the voice input unit and recognizing the keyword; a voice synthesis unit for synthesizing the action pattern in the storage unit as a voice; a voice output unit for outputting the voice synthesized by the voice synthesis unit; and a control unit for selecting the action pattern corresponding to the keyword recognized by the voice recognition unit from a plurality of action patterns in the storage unit and controlling the voice synthesis unit based on the selected action pattern to synthesize the action pattern as a voice.

However, if the user forgets the action the user has come up with most recently, the above conventional technique cannot remind the user of the action, and further improvement is needed.

SUMMARY OF THE INVENTION

The present disclosure has been made to solve the above problem. An object of the present disclosure is to provide an information processing method, an information processing device, and a non-transitory computer-readable recording medium recording an information processing program capable of, when a user forgets an action the user has most recently come up with, reminding the user of the action and reducing a mental burden on the user.

An information processing method according to one aspect of the present disclosure includes, by a computer: acquiring uttered voice data indicating an action of a user and being uttered by the user; detecting a moving motion of the user; detecting a stationary motion of the user; determining whether a predetermined time has elapsed in a state where the user is stationary; and notifying the user of contents of the action of the user based on the uttered voice data when it is determined that the predetermined time has elapsed in the state where the user is stationary.

Figure 1:
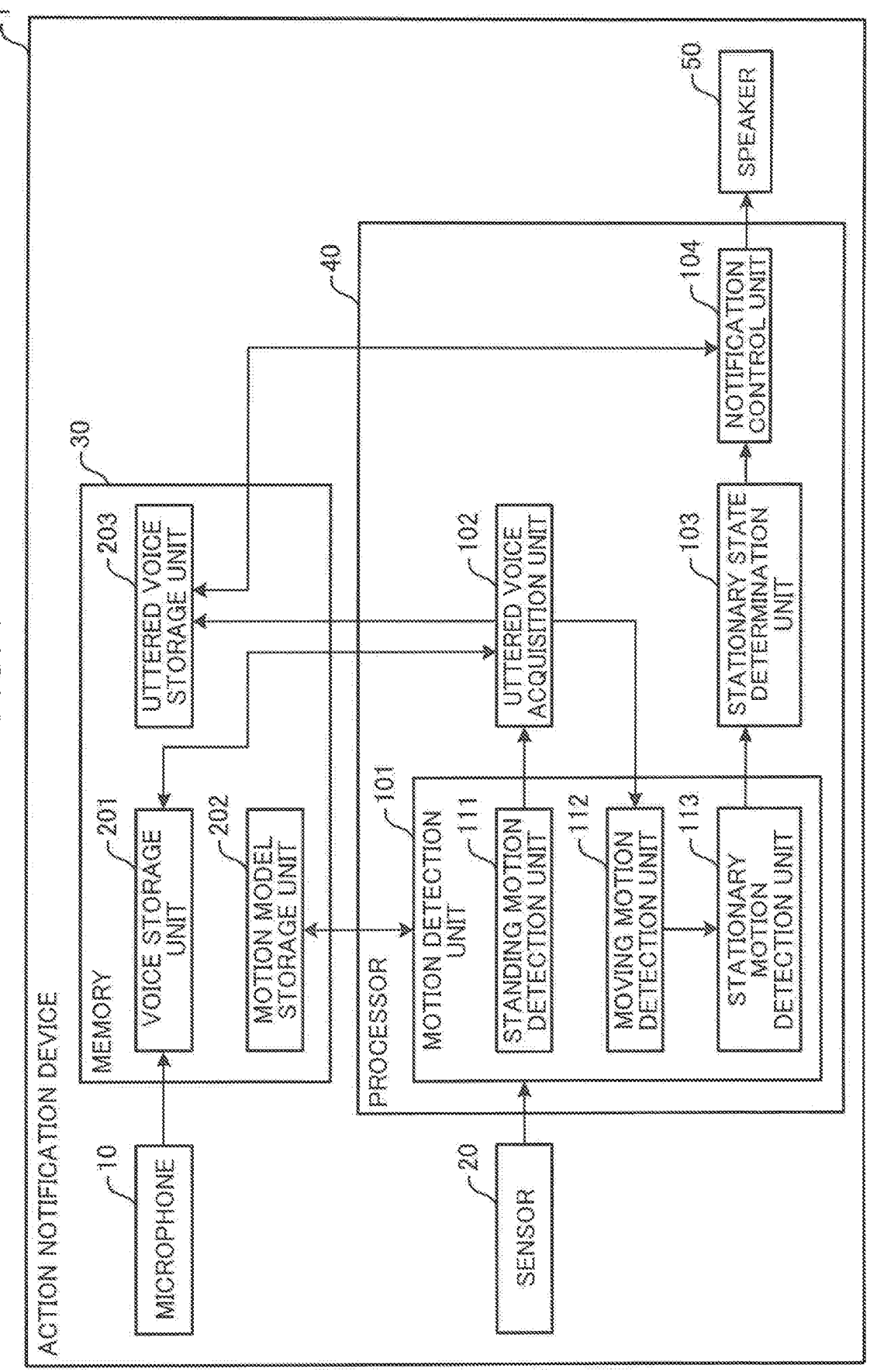
FIG. 1 is a diagram showing a configuration of an action notification device in a first embodiment of the present disclosure.

DESCRIPTION OF EMBODIMENTS (Underlying Knowledge Forming Basis of Present Disclosure)

In the above-described conventional life assisting device, even if a user forgets a routine action the user is accustomed to, a mental burden on the user is reduced by giving the user an opportunity to be reminded of the contents of the action.

If the user forgets a routine action previously stored as an action pattern, the conventional life assisting device can remind the user of the action. However, if the user forgets an action the user has come up with most recently, it is difficult to remind the user of the action, and it is difficult to reduce a mental burden on the user.

To solve the above-described problem, an information processing method according to one aspect of the present disclosure includes, by a computer: acquiring uttered voice data indicating an action of a user and being uttered by the user; detecting a moving motion of the user; detecting a stationary motion of the user; determining whether a predetermined time has elapsed in a state where the user is stationary; and notifying the user of contents of the action of the user based on the uttered voice data when it is determined that the predetermined time has elapsed in the state where the user is stationary.

Here, when a person forgets an action the person has come up with most recently, the person tends to be stationary for a short time to remember the forgotten action. With this configuration, the uttered voice data indicating the action of the user and being uttered by the user is acquired, after the moving motion of the user is detected, the stationary motion of the user is detected, and if it is determined that the predetermined time has elapsed in a state where the user is stationary, the contents of the action of the user is notified based on the uttered voice data. Therefore, when the user forgets the action the user has come up with most recently, this configuration can remind the user of the action and can reduce a mental burden on the user.

The information processing method may further include: acquiring ambient voice data; storing the voice data in a memory; and detecting a predetermined motion of the user. The acquiring the uttered voice data may include, when the predetermined motion of the user is detected, extracting, from the voice data stored in the memory, voice data uttered by the user within a predetermined period including a time point at which the predetermined motion of the user is detected as the uttered voice data.

With this configuration, without receiving a special instruction from the user, the detection of the predetermined motion of the user acts as a trigger for acquiring the uttered voice data from the voice data stored in the memory.

In the information processing method, the predetermined motion may be a standing motion of the user.

With this configuration, the detection of the standing motion of the user acts as a trigger for acquiring the uttered voice data from the voice data stored in the memory.

In the information processing method, the predetermined motion may be the moving motion of the user.

With this configuration, the detection of the moving motion of the user acts as a trigger for acquiring the uttered voice data from the voice data stored in the memory.

The information processing method may further include: acquiring ambient voice data; storing the voice data in a memory; and subjecting the voice data to voice recognition. The acquiring the uttered voice data may include, when the voice data subjected to voice recognition contains the uttered voice data indicating the action of the user, extracting the uttered voice data from the voice data stored in the memory.

With this configuration, without receiving a special instruction from the user, the voice data is subjected to voice recognition, and the voice data subjected to voice recognition containing the uttered voice data indicating the action of the user acts as a trigger for acquiring the uttered voice data from the voice data stored in the memory.

In the information processing method, the notifying the user of the contents of the action may include causing a speaker to output the uttered voice data.

With this configuration, the uttered voice data is output from the speaker, allowing the user who listens to the uttered voice data to remember the forgotten action.

In the information processing method, the notifying the user of the contents of the action may include converting the uttered voice data into text data and causing a display unit to display the converted text data.

With this configuration, the uttered voice data is converted into the text data and the converted text data is displayed on the display unit, allowing the user who looks at the text data to remember the forgotten action.

The information processing method may further include: determining whether the uttered voice data is uttered voice data to be notified to the user. The notifying the user of the contents of the action may include notifying the user of the contents of the action of the user based on the uttered voice data when it is determined that the predetermined time has elapsed in the state where the user is stationary and when it is determined that the uttered voice data is the uttered voice data to be notified to the user.

With this configuration, when it is determined that the predetermined time has elapsed in the state where the user is stationary, and when it is determined that the uttered voice data is the uttered voice data to be notified to the user, the contents of the action of the user is notified based on the uttered voice data. Therefore, it is possible to prevent the user from being notified of unnecessary information, and to notify the user of only necessary information.

In the information processing method, the detecting the moving motion may include detecting the moving motion of the user by using an output waveform from an acceleration sensor, and the detecting the stationary motion may include detecting the stationary motion of the user by using the output waveform from the acceleration sensor.

With this configuration, an output waveform model of the acceleration sensor indicating the moving motion and the stationary motion of the user is stored in advance, and the output waveform from the acceleration sensor is compared with the stored output waveform model. This makes it possible to easily and accurately detect the moving motion and the stationary motion of the user.

An information processing device according to another aspect of the present disclosure includes: an acquisition unit configured to acquire uttered voice data indicating an action of a user and being uttered by the user; a moving motion detection unit configured to detect a moving motion of the user; a stationary motion detection unit configured to detect a stationary motion of the user; a determination unit configured to determine whether a predetermined time has elapsed in a state where the user is stationary; and a notification unit configured to notify the user of contents of the action of the user based on the uttered voice data when it is determined that the predetermined time has elapsed in the state where the user is stationary.

Here, when a person forgets an action the person has come up with most recently, the person tends to be stationary for a short time to remember the forgotten action. With this configuration, the uttered voice data indicating the action of the user and being uttered by the user is acquired, after the moving motion of the user is detected, the stationary motion of the user is detected, and if it is determined that the predetermined time has elapsed in a state where the user is stationary, the contents of the action of the user is notified based on the uttered voice data. Therefore, when the user forgets the action the user has come up with most recently, this configuration can remind the user of the action and can reduce a mental burden on the user.

A non-transitory computer-readable recording medium recording an information processing program according to another aspect of the present disclosure causes a computer to execute: acquiring uttered voice data indicating an action of a user and being uttered by the user; detecting a moving motion of the user; detecting a stationary motion of the user; determining whether a predetermined time has elapsed in a state where the user is stationary; and notifying the user of contents of the action of the user based on the uttered voice data when it is determined that the predetermined time has elapsed in the state where the user is stationary.

Here, when a person forgets an action the person has come up with most recently, the person tends to be stationary for a short time to remember the forgotten action. With this configuration, the uttered voice data indicating the action of the user and being uttered by the user is acquired, after the moving motion of the user is detected, the stationary motion of the user is detected, and if it is determined that the predetermined time has elapsed in a state where the user is stationary, the contents of the action of the user is notified based on the uttered voice data. Therefore, when the user forgets the action the user has come up with most recently, this configuration can remind the user of the action and can reduce a mental burden on the user.

Embodiments of the present disclosure will be described below with reference to the accompanying drawings. Note that the following embodiments are one example embodying the present disclosure, and do not limit the technical scope of the present disclosure.

First Embodiment

FIG. 1 is a diagram showing a configuration of an action notification device in a first embodiment of the present disclosure. The action notification device 1 shown in FIG. 1 includes a microphone 10, a sensor 20, a memory 30, a processor 40, and a speaker 50.

The action notification device 1 is, for example, a smartphone, and is owned by a user.

The memory 30 is, for example, a semiconductor memory, and stores various information items. The memory 30 includes a voice storage unit 201, a motion model storage unit 202, and an uttered voice storage unit 203.

The microphone 10 acquires ambient voice data, and stores the acquired voice data in the voice storage unit 201. The microphone 10 picks up ambient voices, converts picked-up analog data into digital data, and stores the digitized voice data in the voice storage unit 201. The microphone 10 digitizes the analog voice by using, for example, pulse code modulation (PCM). Note that the microphone 10 in the first embodiment always acquires ambient voice data. For example, storage capacity of the voice storage unit 201 has been determined in advance. When the storage capacity of the voice storage unit 201 becomes full, old voice data is preferably overwritten with new voice data in order from old one.

The sensor 20 is, for example, a three-axis acceleration sensor. The sensor 20 measures an acceleration level in an X-axis direction, which is a forward and rearward direction of the user, an acceleration level in a Y-axis direction, which is a rightward and leftward direction of the user, and an acceleration level in a Z-axis direction, which is an upward and downward direction of the user. Since the user owns the action notification device 1, the sensor 20 can detect the acceleration level in the X-axis direction, the acceleration level in the Y-axis direction, and the acceleration level in the Z-axis direction of the user.

The processor 40 includes a motion detection unit 101, an uttered voice acquisition unit 102, a stationary state determination unit 103, and a notification control unit 104.

The motion detection unit 101 detects a moving motion of the user, a stationary motion of the user, and a predetermined motion of the user by using output waveforms from the sensor 20. Note that the predetermined motion in the first embodiment is a standing motion of standing from a state where the user is seated. The motion detection unit 101 includes a standing motion detection unit 111, a moving motion detection unit 112, and a stationary motion detection unit 113.

The standing motion detection unit 111 detects the standing motion of the user by using the output waveforms from the sensor 20.

The moving motion detection unit 112 detects the moving motion of the user by using the output waveforms from the sensor 20.

The stationary motion detection unit 113 detects the stationary motion of the user by using the output waveforms from the sensor 20.

The motion model storage unit 202 stores in advance an output waveform model of the acceleration level representing the moving motion of the user, an output waveform model of the acceleration level representing the stationary motion of the user, and an output waveform model of the acceleration level representing the standing motion of the user. The motion detection unit 101 detects the motion of the user by comparing the output waveforms from the sensor 20 with the output waveform models stored in the motion model storage unit 202. That is, the standing motion detection unit 111 detects the standing motion of the user by comparing the output waveforms from the sensor 20 with the output waveform model representing the standing motion stored in the motion model storage unit 202. The moving motion detection unit 112 detects the moving motion of the user by comparing the output waveforms from the sensor 20 with the output waveform model representing the moving motion stored in the motion model storage unit 202. Furthermore, the stationary motion detection unit 113 detects the stationary motion of the user by comparing the output waveforms from the sensor 20 with the output waveform model representing the stationary motion stored in the motion model storage unit 202.

The uttered voice acquisition unit 102 acquires the uttered voice data indicating the action of the user and being uttered by the user. The uttered voice acquisition unit 102 acquires the uttered voice data uttered by the user from the voice storage unit 201, and stores the acquired uttered voice data in the uttered voice storage unit 203. When the predetermined motion of the user is detected, the uttered voice acquisition unit 102 extracts, from the voice data stored in the voice storage unit 201 of the memory 30, voice data uttered by the user within a predetermined period including a time point at which the predetermined motion of the user is detected as the uttered voice data. Note that the predetermined motion in the first embodiment is the standing motion of standing from a state where the user is seated.

The uttered voice storage unit 203 stores the uttered voice data acquired by the uttered voice acquisition unit 102.

The stationary state determination unit 103 determines whether a predetermined time has elapsed in a state where the user is stationary. The predetermined time is, for example, five seconds, which is time for the user to try to remember the action the user has forgotten for the moment.

When the stationary state determination unit 103 determines that the predetermined time has elapsed in a state where the user is stationary, the notification control unit 104 notifies the user of contents of the action of the user based on the uttered voice data. The notification control unit 104 reads the uttered voice data stored in the uttered voice storage unit 203 and causes the speaker 50 to output the uttered voice data.

The speaker 50 outputs the uttered voice data in response to an instruction from the notification control unit 104.

When performing some action in a state where the user is seated, first, the user utters contents of the action to be performed next and performs the standing motion. For example, when the user seated in a chair goes to a refrigerator to have a juice drink, the user utters "I'll go have a juice drink" and stands up. Then, the user moves from a place where the user stands up to a destination. For example, when the user goes to the refrigerator to have a juice drink, the user moves from the place where the user stands up to the refrigerator. Then, when arriving at the destination, the user performs a target action at the destination. For example, when the user goes to the refrigerator to have a juice drink, the user who has arrived at the front of the refrigerator takes out a juice drink from the refrigerator and drinks the taken out juice drink. At this time, when arriving at the front of the refrigerator, the user may forget the purpose of coming to the front of the refrigerator. In particular, when arriving at the destination, the user who has forgotten the target action becomes stationary for a while in order to remember the purpose of coming to the front of the refrigerator. Therefore, if the user becomes stationary for a predetermined time after the movement, it can be assumed that the user has forgotten the target action.

In this way, the standing motion of the user acts as a trigger, whereby the action notification device 1 of the first embodiment stores the voice uttered before and after the time point at which the user stands up. This is because it can be assumed that the voice uttered before and after the time point at which the user stands up is the voice representing contents of the action to be performed next by the user. Then, the action notification device 1 detects a series of motions of the user who has forgotten the action the user has considered most recently, and outputs the stored voice uttered by the user, thereby notifying the user of contents of the action the user has forgotten.

Figure 2:
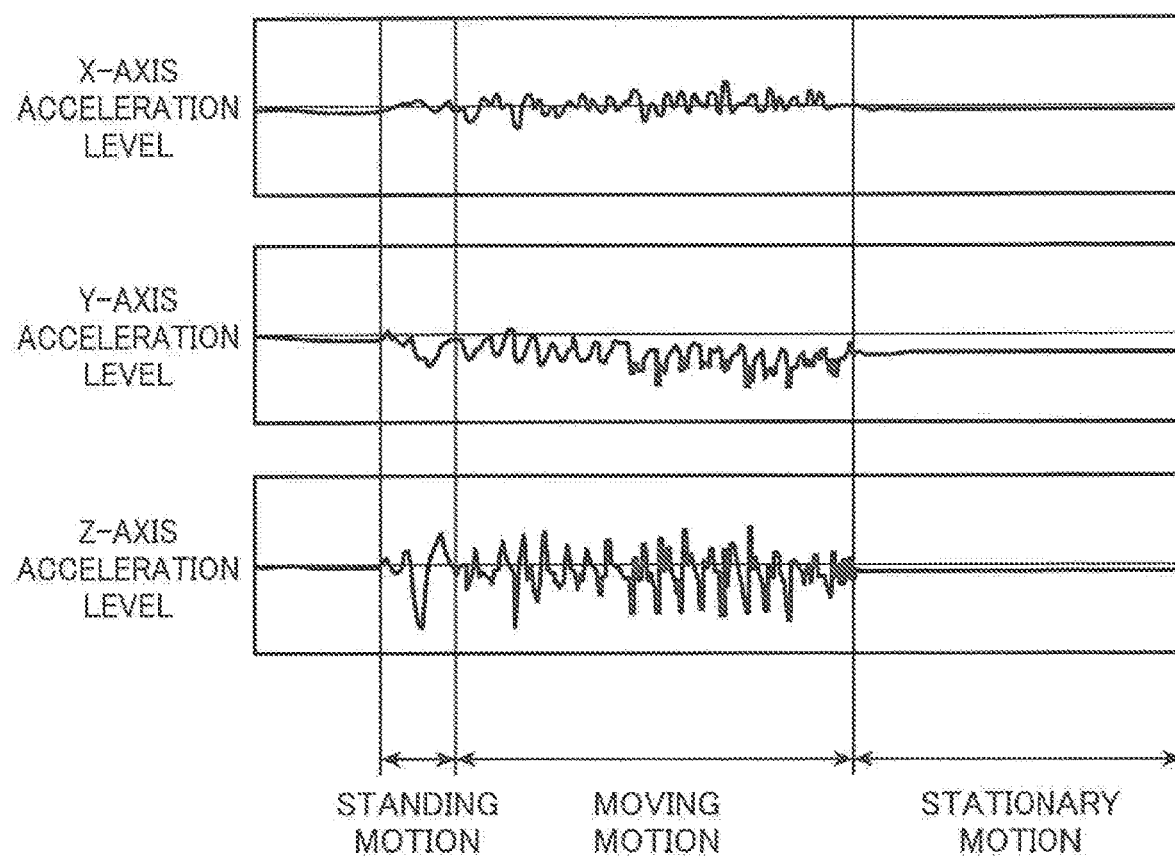
FIG. 2 is a diagram for describing a motion of a user with respect to output waveforms from a sensor.

FIG. 2 is a diagram for describing the motion of the user with respect to output waveforms from the sensor.

In FIG. 2, the sensor 20, which is an acceleration sensor, outputs the X-axis acceleration level, the Y-axis acceleration level, and the Z-axis acceleration level. As shown in FIG. 2, the output waveforms of the X-axis acceleration level, the Y-axis acceleration level, and the Z-axis acceleration level are different depending on the motion performed by the user: the standing motion, the moving motion, and the stationary motion.

The motion model storage unit 202 stores in advance: the output waveform model of the X-axis acceleration level, the Y-axis acceleration level, and the Z-axis acceleration level representing the moving motion of the user; the output waveform model of the X-axis acceleration level, the Y-axis acceleration level, and the Z-axis acceleration level representing the stationary motion of the user; and the output waveform model of the X-axis acceleration level, the Y-axis acceleration level, and the Z-axis acceleration level representing the standing motion of the user. The motion detection unit 101 can detect the standing motion, the moving motion, and the stationary motion of the user by comparing the output waveforms of the X-axis acceleration level, the Y-axis acceleration level, and the Z-axis acceleration level from the sensor 20 with the output waveform models of the X-axis acceleration level, the Y-axis acceleration level, and the Z-axis acceleration level stored in advance in the motion model storage unit 202.

Subsequently, the operation of the action notification device 1 in the first embodiment will be described.

Figure 3:
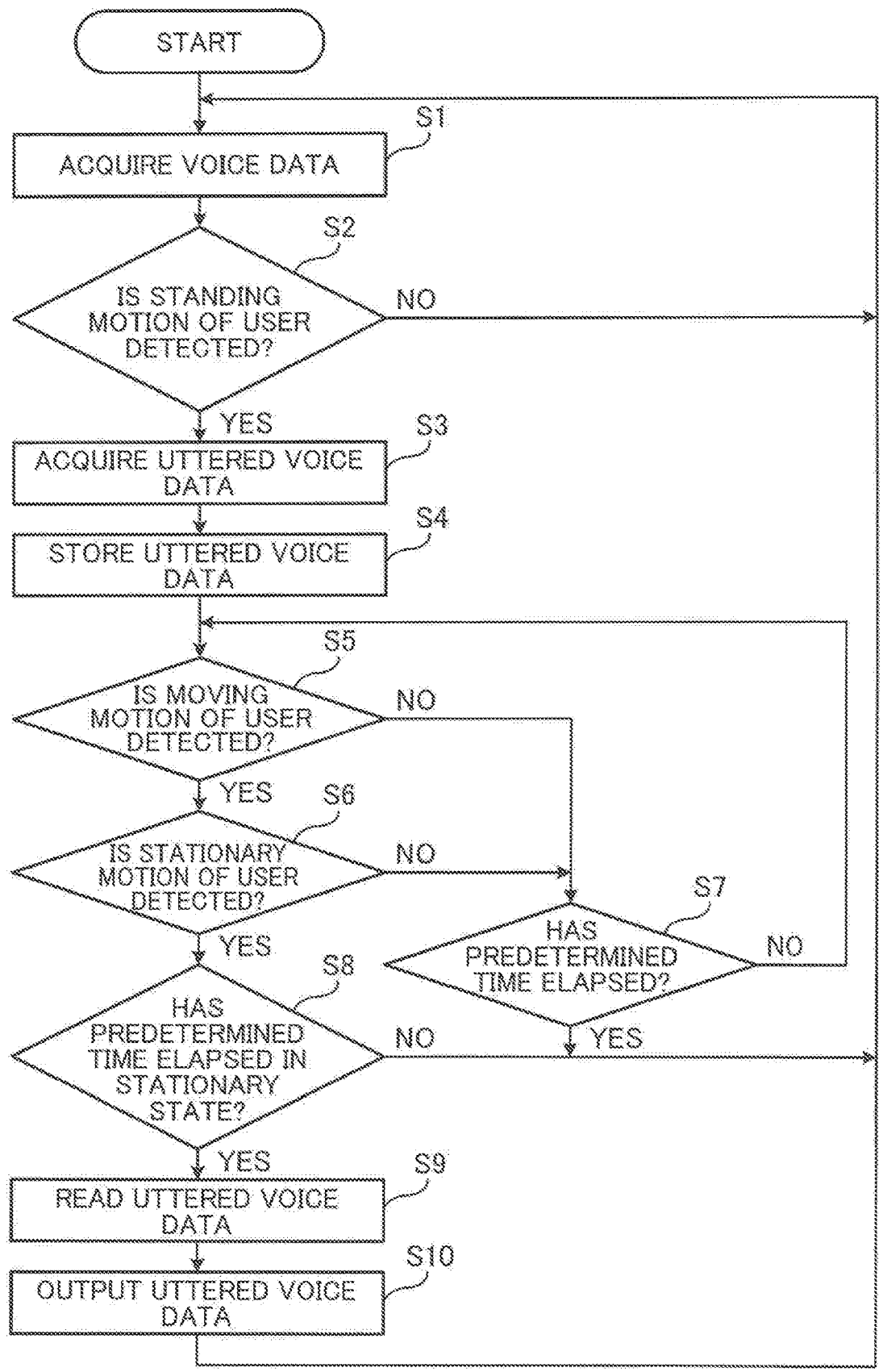
FIG. 3 is a flowchart for describing an operation of the action notification device in the first embodiment.

FIG. 3 is a flowchart for describing the operation of the action notification device in the first embodiment.

First, in step S1, the microphone 10 acquires ambient voice data. The microphone 10 converts the picked-up voice of analog data into digital data, and stores the digitized voice data in the voice storage unit 201.

Next, in step S2, the standing motion detection unit 111 determines whether the standing motion of the user has been detected. The standing motion detection unit 111 compares the output waveforms from the sensor 20 with the output waveform model of the standing motion stored in the motion model storage unit 202. Then, when the output waveforms from the sensor 20 agree with the output waveform model of the standing motion stored in the motion model storage unit 202, the standing motion detection unit 111 detects the standing motion of the user. Here, when it is determined that the standing motion of the user has not been detected (NO in step S2), the process returns to step S1.

On the other hand, when it is determined that the standing motion of the user has been detected (YES in step S2), in step S3, the uttered voice acquisition unit 102 acquires uttered voice data indicating the action of the user and being uttered by the user. At this time, from the voice data stored in the voice storage unit 201 of the memory 30, the uttered voice acquisition unit 102 detects an utterance section in which the user gives utterance in a period from a first time point that is a predetermined time before a detection time point at which the standing motion is detected to a second time point that is a predetermined time after the detection time point. Then, the uttered voice acquisition unit 102 extracts the voice data in the detected utterance section as the uttered voice data. It is assumed that the utterance of the user uttered when the standing motion is performed indicates the next action of the user.

Next, in step S4, the uttered voice acquisition unit 102 stores the acquired uttered voice data in the uttered voice storage unit 203.

Next, in step S5, the moving motion detection unit 112 determines whether the moving motion of the user has been detected. The moving motion detection unit 112 compares the output waveforms from the sensor 20 with the output waveform model of the moving motion stored in the motion model storage unit 202. Then, when the output waveforms from the sensor 20 agree with the output waveform model of the moving motion stored in the motion model storage unit 202, the moving motion detection unit 112 detects the moving motion of the user.

Here, when it is determined that the moving motion of the user has been detected (YES in step S5), in step S6, the stationary motion detection unit 113 determines whether the stationary motion of the user has been detected. The stationary motion detection unit 113 compares the output waveforms from the sensor 20 with the output waveform model of the stationary motion stored in the motion model storage unit 202. Then, when the output waveforms from the sensor 20 agree with the output waveform model of the stationary motion stored in the motion model storage unit 202, the stationary motion detection unit 113 detects the stationary motion of the user.

Here, when it is determined that the moving motion of the user has not been detected (NO in step S5), or when it is determined that the stationary motion of the user has not been detected (NO in step S6), in step S7, the moving motion detection unit 112 determines whether a predetermined time has elapsed from the time when the standing motion of the user is detected. Note that the time at which the standing motion of the user is detected is stored in the memory 30. Here, when it is determined that the predetermined time has not elapsed from the time when the standing motion of the user is detected (NO in step S7), the process returns to step S5.

On the other hand, when it is determined that the predetermined time has elapsed from the time when the standing motion of the user is detected (YES in step S7), the process returns to step S1.

The predetermined time in the processing of step S7 is a timeout time. When the moving motion of the user is not detected even when the predetermined time has elapsed since the standing motion of the user is detected, the process returns to step S1. Meanwhile, when the stationary motion of the user is not detected and the moving motion of the user is continuously detected even when the predetermined time has elapsed since the standing motion of the user is detected, the process returns to step S1.

When it is determined that the stationary motion of the user is detected (YES in step S6), in step S8, the stationary state determination unit 103 determines whether the predetermined time has elapsed in a state where the user is stationary. Note that the stationary state determination unit 103 measures a time during which the stationary motion of the user is continuously detected since the stationary motion of the user is detected.

When it is determined that the predetermined time has not elapsed in a state where the user is stationary (NO in step S8), that is, when it is determined that the user has started moving before the predetermined time elapses since the stationary motion of the user is detected, the process returns to step S1.

On the other hand, when it is determined that the predetermined time has elapsed in a state where the user is stationary (YES in step S8), in step S9, the notification control unit 104 reads the uttered voice data from the uttered voice storage unit 203.

Next, in step S10, the notification control unit 104 outputs the uttered voice data from the speaker 50. Even if the user suddenly forgets the action the user has come up with most recently, the user can remember the action forgotten for the moment by listening to the uttered voice output from the speaker 50.

In this way, in the first embodiment, if the user forgets the action the user has come up with most recently, the user can be reminded of the action and a mental burden on the user can be reduced.

In the first embodiment, the notification control unit 104 causes the speaker 50 to output the uttered voice data, but the present disclosure is not particularly limited thereto. The notification control unit 104 may convert the uttered voice data into text data and display the converted text data on a display unit. In this case, the action notification device 1 includes the display unit instead of the speaker 50.

Also, the action notification device 1 may include the speaker 50 and the display unit. The notification control unit 104 may output the uttered voice data from the speaker 50 and may display the text data generated from the uttered voice data on the display unit.

Also, in the first embodiment, the notification control unit 104 causes the speaker 50 to output the uttered voice data uttered by the user as it is, but the present disclosure is not particularly limited thereto. The notification control unit 104 may extract noun and verb words from the uttered voice data, combine the extracted words to generate notification voice data notifying the user of the action to be performed next by the user, and cause the speaker 50 to output the generated notification voice data. For example, when the uttered voice data is "I'll go have a juice drink", the notification control unit 104 may generate notification voice data of "Aren't you going to have a juice drink?"

Also, in the first embodiment, the sensor 20 is an acceleration sensor, but the present disclosure is not particularly limited thereto. The sensor 20 is not limited to the acceleration sensor as long as the sensor 20 can detect the motion of the user, in particular, the standing motion, the moving motion, and the stationary motion of the user. The sensor 20 may be, for example, an image sensor for capturing an image of the user. In this case, the motion detection unit 101 detects the motion of the user from the image acquired by the image sensor.

Second Embodiment

In the first embodiment, detection of the standing motion of the user acts as a trigger for acquiring the uttered voice data. However, the user is not necessarily seated when the user comes up with a next action. Therefore, in a second embodiment, start of movement of the user acts as a trigger for acquiring the uttered voice data.

Figure 4:
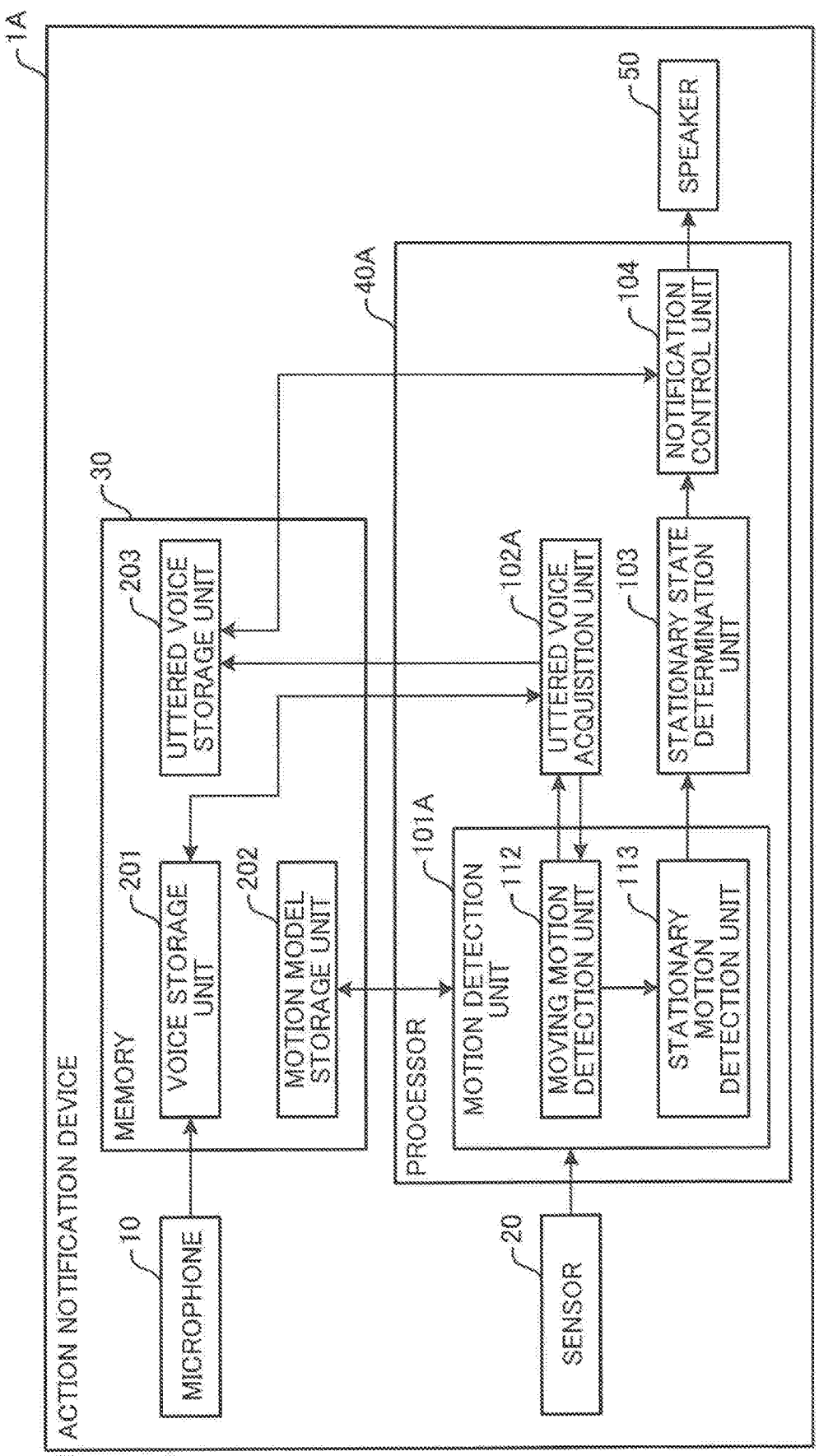
FIG. 4 is a diagram showing a configuration of an action notification device in a second embodiment of the present disclosure.

FIG. 4 is a diagram showing a configuration of an action notification device in the second embodiment of the present disclosure. The action notification device 1A shown in FIG. 4 includes a microphone 10, a sensor 20, a memory 30, a processor 40A, and a speaker 50. In the second embodiment, components identical to components of the first embodiment are denoted with identical reference signs, and descriptions thereof will be omitted.

The processor 40A includes a motion detection unit 101A, an uttered voice acquisition unit 102A, a stationary state determination unit 103, and a notification control unit 104.

The motion detection unit 101A detects a moving motion of the user, a stationary motion of the user, and a predetermined motion of the user by using output waveforms from the sensor 20. Note that the predetermined motion in the second embodiment is a moving motion of the user. The motion detection unit 101A includes a moving motion detection unit 112 and a stationary motion detection unit 113.

The uttered voice acquisition unit 102A acquires uttered voice data indicating an action of the user and being uttered by the user. The uttered voice acquisition unit 102A acquires the uttered voice data uttered by the user from a voice storage unit 201, and stores the acquired uttered voice data in an uttered voice storage unit 203. When the predetermined motion of the user is detected, the uttered voice acquisition unit 102A extracts, from the voice data stored in the voice storage unit 201 of the memory 30, voice data uttered by the user within a predetermined period including a time point at which the predetermined motion of the user is detected as the uttered voice data. Note that the predetermined motion in the second embodiment is the moving motion of the user.

Subsequently, an operation of the action notification device 1A in the second embodiment will be described.

Figure 5:
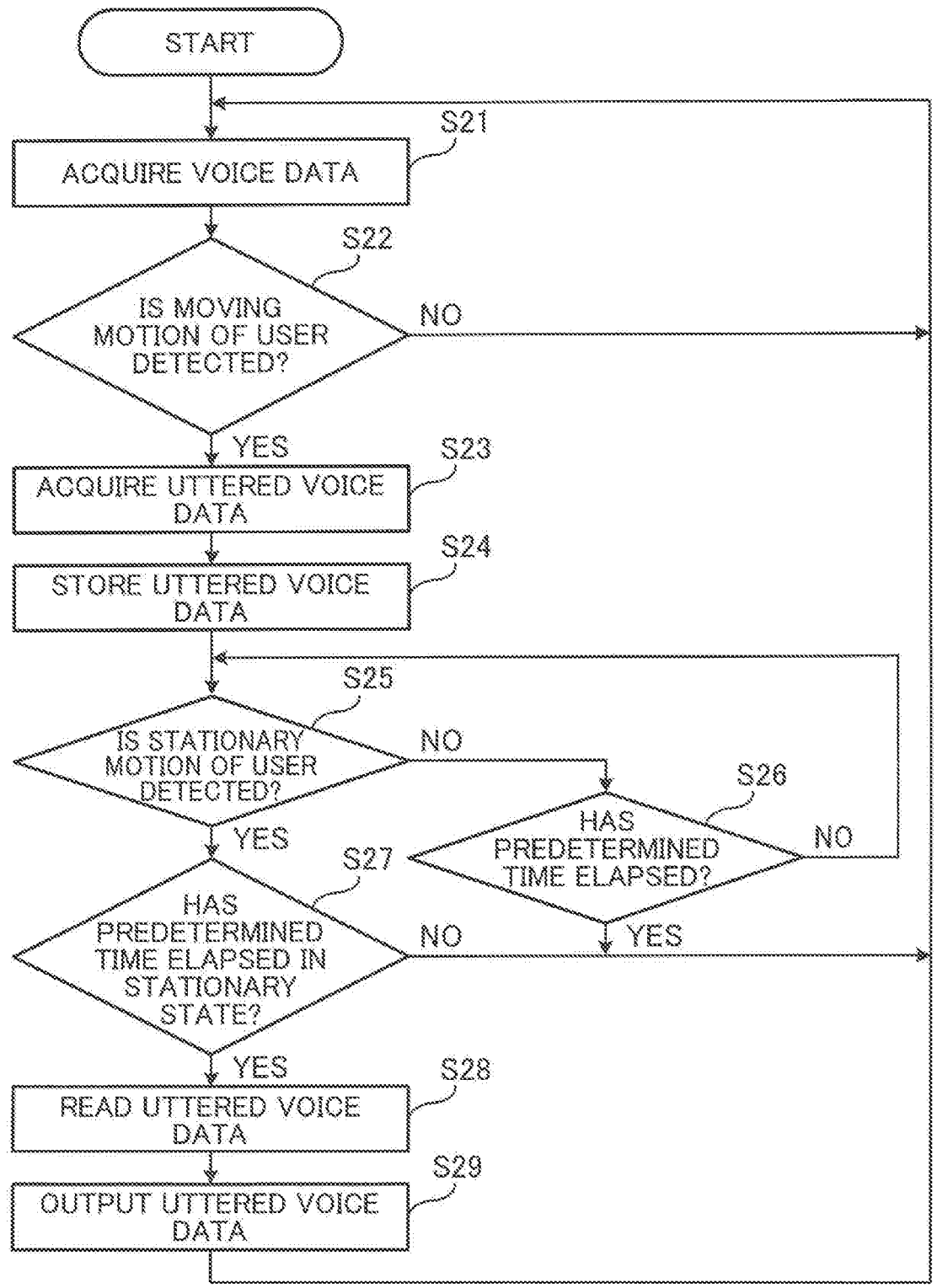
FIG. 5 is a flowchart for describing an operation of the action notification device in the second embodiment.

FIG. 5 is a flowchart for describing the operation of the action notification device in the second embodiment.

First, processing of step S21 is the same as processing of step S1 shown in FIG. 3, and thus descriptions thereof will be omitted.

Next, in step S22, the moving motion detection unit 112 determines whether the moving motion of the user has been detected. The moving motion detection unit 112 compares the output waveforms from the sensor 20 with the output waveform model of the moving motion stored in the motion model storage unit 202. Then, when the output waveforms from the sensor 20 agree with the output waveform model of the moving motion stored in the motion model storage unit 202, the moving motion detection unit 112 detects the moving motion of the user.

Here, when it is determined that the moving motion of the user has not been detected (NO in step S22), the process returns to step S21.

On the other hand, when it is determined that the moving motion of the user has been detected (YES in step S22), in step S23, the uttered voice acquisition unit 102A acquires uttered voice data indicating the action of the user and being uttered by the user. At this time, from the voice data stored in the voice storage unit 201 of the memory 30, the uttered voice acquisition unit 102A detects an utterance section in which the user gives utterance in a period from a first time point that is a predetermined time before a detection time point at which the moving motion is detected to a second time point that is a predetermined time after the detection time point. Then, the uttered voice acquisition unit 102A extracts the voice data in the detected utterance section as the uttered voice data. It is assumed that the utterance of the user uttered when the moving motion is performed indicates the next action of the user.

Note that processing of steps S23 and S24 is the same as processing of steps S3 and S4 shown in FIG. 3, and thus descriptions thereof will be omitted.

Next, in step S25, the stationary motion detection unit 113 determines whether the stationary motion of the user has been detected. The stationary motion detection unit 113 compares the output waveforms from the sensor 20 with the output waveform model of the stationary motion stored in the motion model storage unit 202. Then, when the output waveforms from the sensor 20 agree with the output waveform model of the stationary motion stored in the motion model storage unit 202, the stationary motion detection unit 113 detects the stationary motion of the user.

Here, when it is determined that the stationary motion of the user has not been detected (NO in step S25), in step S26, the moving motion detection unit 112 determines whether a predetermined time has elapsed from the time when the moving motion of the user is detected. Note that the time when the moving motion of the user is detected is stored in the memory 30. Here, when it is determined that the predetermined time has not elapsed from the time when the moving motion of the user is detected (NO in step S26), the process returns to step S25.

On the other hand, when it is determined that the predetermined time has elapsed from the time when the moving motion of the user is detected (YES in step S26), the process returns to step S21.

The predetermined time in the processing of step S26 is a timeout time. When the stationary motion of the user is not detected and the moving motion of the user is continuously detected even when the predetermined time has elapsed since the moving motion of the user is detected, the process returns to step S21. In the second embodiment, since the moving motion of the user has already been detected in step S22, the moving motion of the user is continuously detected until the stationary motion of the user is detected in step S25.

When it is determined that the stationary motion of the user is detected (YES in step S25), in step S27, the stationary state determination unit 103 determines whether the predetermined time has elapsed in a state where the user is stationary.

Note that processing of steps S27 to S29 is the same as processing of steps S8 to S10 shown in FIG. 3, and thus descriptions thereof will be omitted.

In this way, in the second embodiment, if the user forgets the action the user has come up with most recently, the user can be reminded of the action and a mental burden on the user can be reduced. Also, in the second embodiment, start of the movement of the user acts as a trigger for acquiring the uttered voice data.

Third Embodiment

In the first and second embodiments, detection of the standing motion and the moving motion of the user acts as a trigger for acquiring the uttered voice data. In a third embodiment, voice data is subjected to voice recognition, and the voice data subjected to voice recognition containing uttered voice data indicating an action of a user acts as a trigger for acquiring the uttered voice data.

Figure 6:
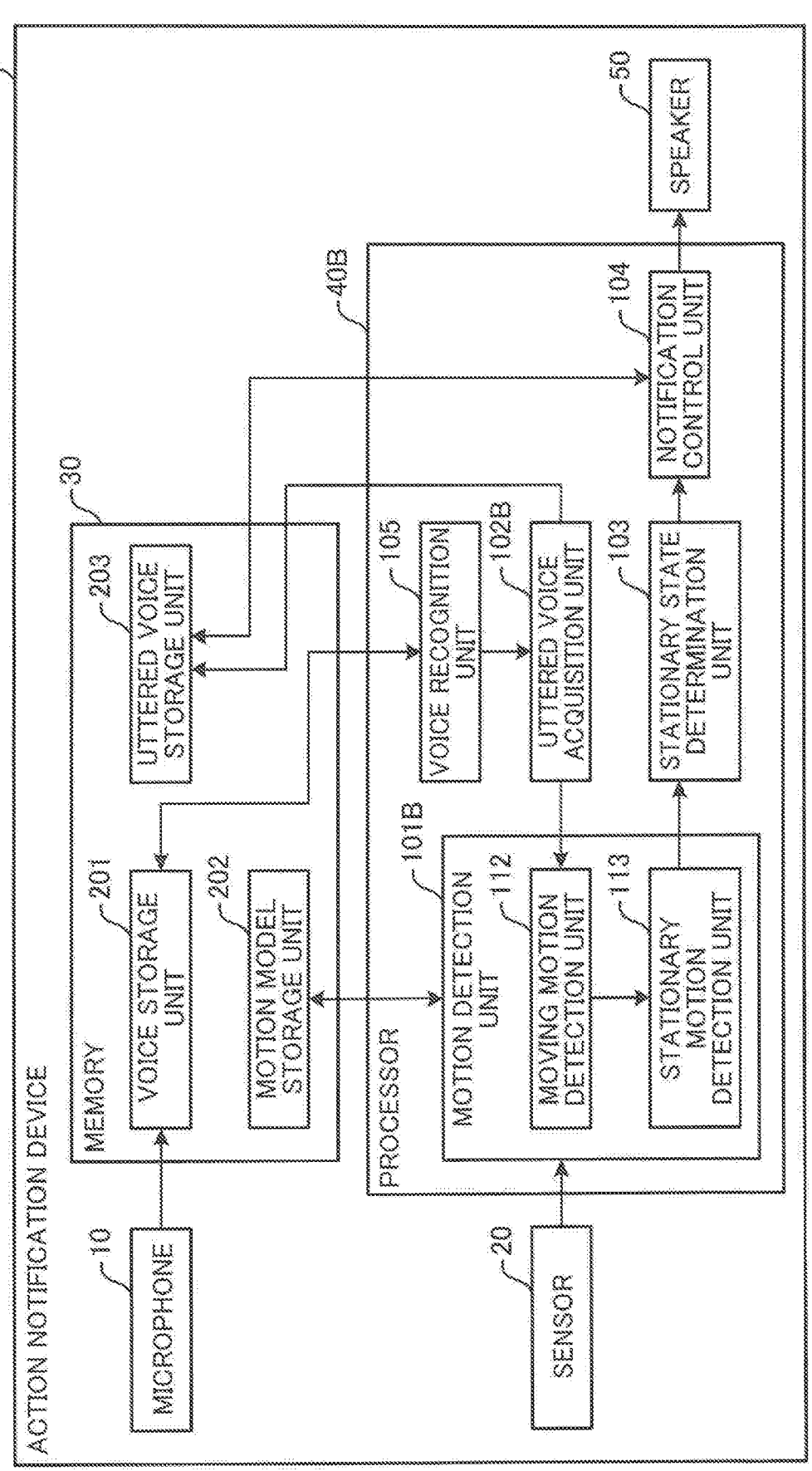
FIG. 6 is a diagram showing a configuration of an action notification device in a third embodiment of the present disclosure.

FIG. 6 is a diagram showing a configuration of an action notification device in the third embodiment of the present disclosure. The action notification device 1B shown in FIG. 6 includes a microphone 10, a sensor 20, a memory 30, a processor 40B, and a speaker 50. In the third embodiment, components identical to components of the first embodiment are denoted with identical reference signs, and descriptions thereof will be omitted.

The processor 40B includes a motion detection unit 101B, an uttered voice acquisition unit 102B, a stationary state determination unit 103, a notification control unit 104, and a voice recognition unit 105.

The motion detection unit 101B detects a moving motion of the user and a stationary motion of the user by using output waveforms from the sensor 20. The motion detection unit 101B includes a moving motion detection unit 112 and a stationary motion detection unit 113.

The voice recognition unit 105 subjects voice data stored in a voice storage unit 201 to voice recognition. By executing known voice recognition processing using an acoustic model and a language model stored in the memory 30 on the digitalized voice data, the voice recognition unit 105 detects a voice uttered by a person contained in the voice indicated by the voice data, and converts the voice data into text data representing the contents of the voice. Note that the voice recognition unit 105 may use an acoustic model and a language model stored on a cloud server. The acoustic model holds sound waveform samples, and the language model holds verbal information such as arrangement of words of a predetermined language. When using the acoustic model and the language model stored on the cloud server, the action notification device 1B transmits the digitized voice data to the cloud server and receives the text data converted on the cloud server.

The uttered voice acquisition unit 102B acquires the uttered voice data indicating the action of the user and being uttered by the user. The uttered voice acquisition unit 102B acquires the uttered voice data uttered by the user from the voice storage unit 201, and stores the acquired uttered voice data in an uttered voice storage unit 203.

More specifically, when the voice data subjected to voice recognition by the voice recognition unit 105 contains the uttered voice data indicating the action of the user, the uttered voice acquisition unit 102B extracts the uttered voice data from the voice data stored in the memory 30. Here, the memory 30 stores a database containing a plurality of phrases indicating that the user is going to perform an action to attain some objective. The uttered voice acquisition unit 102B compares the text data converted from the voice data by the voice recognition unit 105 with the phrases in the database stored in the memory 30. When there is text data containing a phrase that matches the phrase in the database, the uttered voice acquisition unit 102B extracts, as uttered voice data, the voice data corresponding to the text data.

For example, when the database stores a phrase "I'll go" and the user utters "I'll go have a juice drink", the text data "I'll go have a juice drink" contains the phrase "I'll go", and thus the uttered voice acquisition unit 102B extracts the voice data "I'll go have a juice drink" as uttered voice data.

Subsequently, the operation of the action notification device 1B in the third embodiment will be described.

Figure 7:
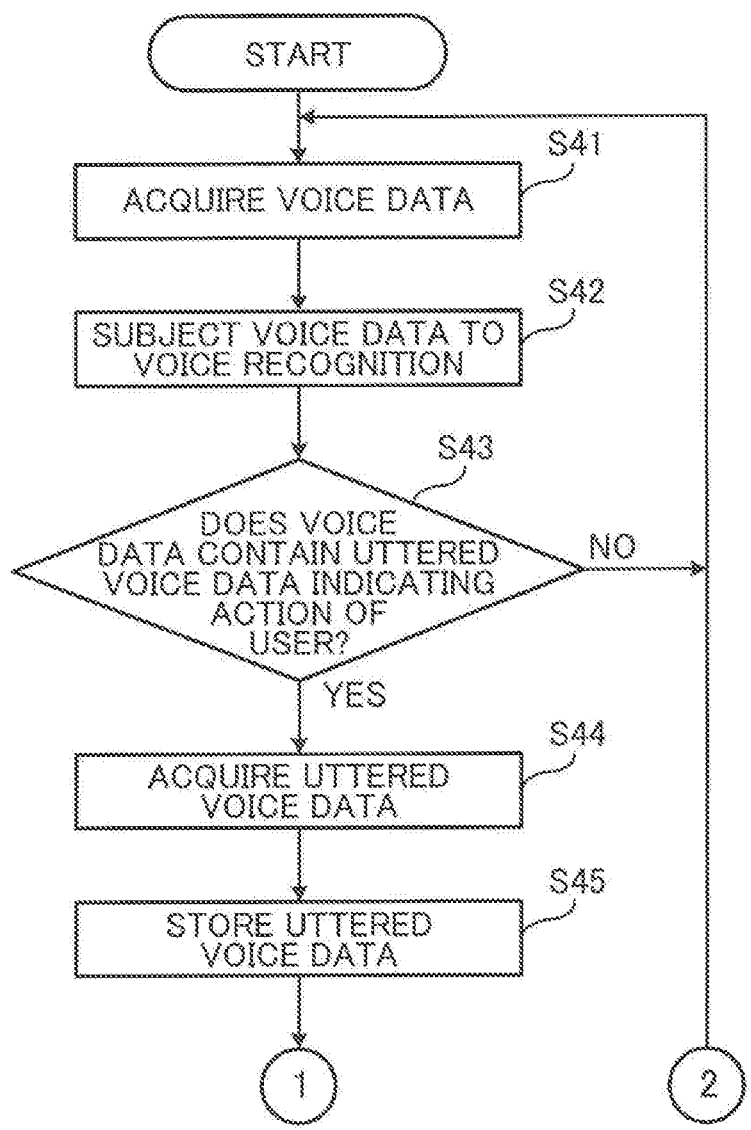
FIG. 7 is a first flowchart for describing an operation of the action notification device in the third embodiment.
Figure 8:
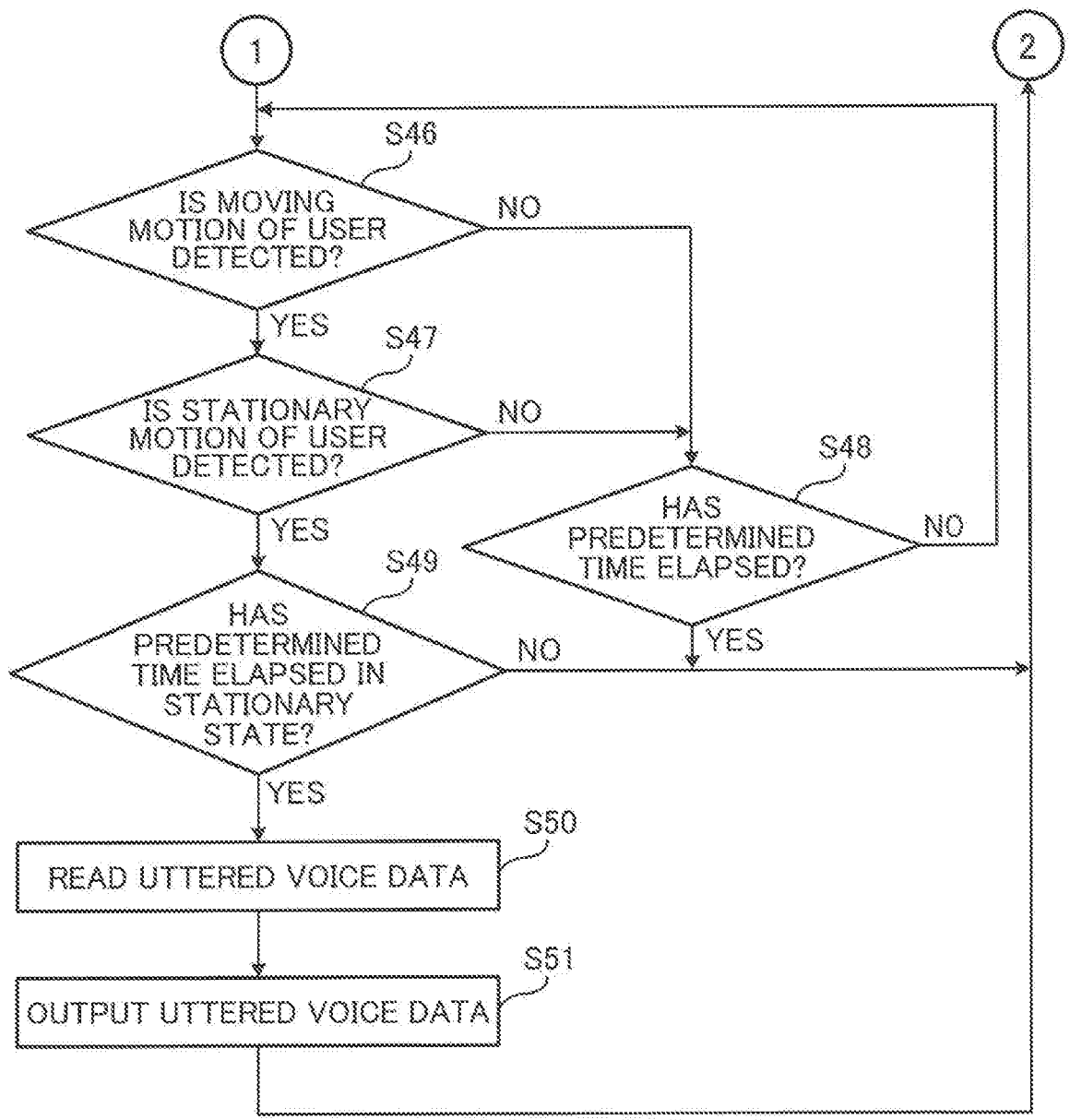
FIG. 8 is a second flowchart for describing the operation of the action notification device in the third embodiment.

FIG. 7 is a first flowchart for describing the operation of the action notification device in the third embodiment. FIG. 8 is a second flowchart for describing the operation of the action notification device in the third embodiment.

First, processing of step S41 is the same as processing of step S1 shown in FIG. 3, and thus descriptions thereof will be omitted.

Next, in step S42, the voice recognition unit 105 subjects the voice data stored in the voice storage unit 201 of the memory 30 to voice recognition.

Next, in step S43, the uttered voice acquisition unit 102B determines whether the voice data subjected to voice recognition by the voice recognition unit 105 contains uttered voice data indicating the action of the user. Here, when it is determined that the voice data does not contain the uttered voice data indicating the action of the user (NO in step S43), the process returns to step S41.

On the other hand, when it is determined that the voice data contains the uttered voice data indicating the action of the user (YES in step S43), in step S44, the uttered voice acquisition unit 102B acquires the uttered voice data indicating the action of the user from the voice data stored in the voice storage unit 201.

Next, in step S45, the uttered voice acquisition unit 102B stores the acquired uttered voice data in the uttered voice storage unit 203.

Note that processing of steps S46 to S51 is the same as processing of steps S5 to S10 shown in FIG. 3, and thus descriptions thereof will be omitted.

In this way, in the third embodiment, if the user forgets the action the user has come up with most recently, the user can be reminded of the action and a mental burden on the user can be reduced. Also, in the third embodiment, the voice data subjected to voice recognition containing the uttered voice data indicating the action of the user acts as a trigger for acquiring the uttered voice data.

Fourth Embodiment

In the first embodiment, the uttered voice data acquired when the standing motion of the user is detected is output from the speaker. In the fourth embodiment, when it is determined that a predetermined time has elapsed in a state where the user is stationary, uttered voice data acquired when the standing motion of the user is detected is subjected to voice recognition, and when the uttered voice data subjected to voice recognition is uttered voice data to be notified to the user, the uttered voice data is output from a speaker.

Figure 9:
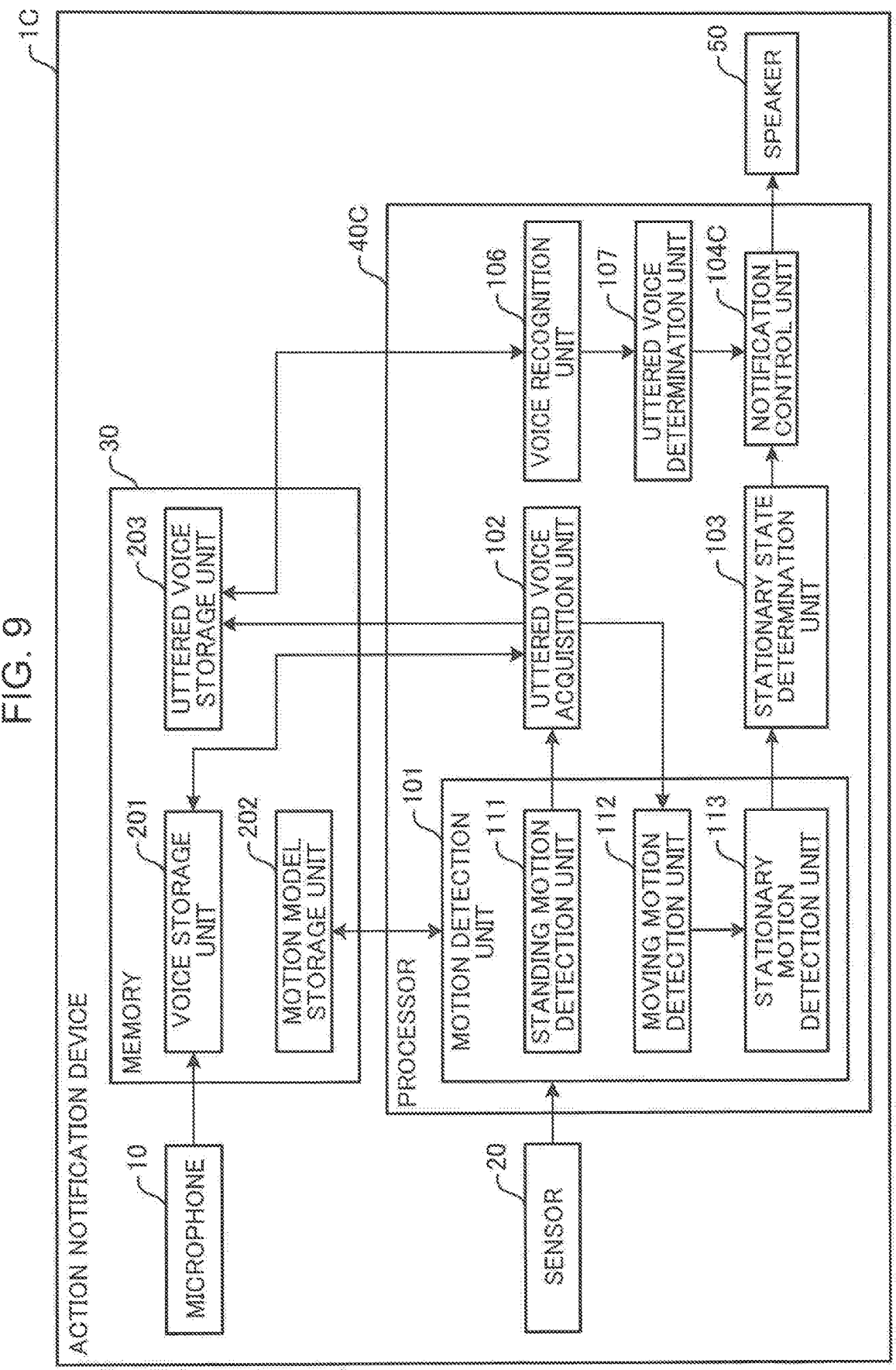
FIG. 9 is a diagram showing a configuration of an action notification device in a fourth embodiment of the present disclosure.

FIG. 9 is a diagram showing a configuration of an action notification device in the fourth embodiment of the present disclosure. The action notification device 1C shown in FIG. 9 includes a microphone 10, a sensor 20, a memory 30, a processor 40C, and a speaker 50. In the fourth embodiment, components identical to components of the first embodiment are denoted with identical reference signs, and descriptions thereof will be omitted.

The processor 40C includes a motion detection unit 101, an uttered voice acquisition unit 102, a stationary state determination unit 103, a notification control unit 104C, a voice recognition unit 106, and an uttered voice determination unit 107.

The voice recognition unit 106 subjects uttered voice data stored in an uttered voice storage unit 203 to voice recognition. By executing known voice recognition processing using an acoustic model and a language model stored in the memory 30 on the digitalized uttered voice data, the voice recognition unit 106 detects a voice uttered by a person contained in the voice indicated by the uttered voice data, and converts the uttered voice data into text data representing the contents of the voice. Note that the voice recognition unit 106 may use an acoustic model and a language model stored on a cloud server. The acoustic model holds sound waveform samples, and the language model holds verbal information such as arrangement of words of a predetermined language. When using the acoustic model and the language model stored on the cloud server, the action notification device 1C transmits the digitized uttered voice data to the cloud server and receives the text data converted on the cloud server.

The uttered voice determination unit 107 determines whether the uttered voice data is uttered voice data to be notified to the user.

More specifically, the memory 30 stores a database containing a plurality of phrases indicating that the user is going to perform an action to attain some objective. The uttered voice determination unit 107 compares the text data converted from the uttered voice data by the voice recognition unit 106 with the phrases in the database stored in the memory 30. When the phrase contained in the text data matches the phrase in the database, the uttered voice determination unit 107 determines that the uttered voice data is the uttered voice data to be notified to the user. On the other hand, when the phrase contained in the text data do not match the phrase in the database, the uttered voice determination unit 107 determines that the uttered voice data is not the uttered voice data to be notified to the user.

For example, when the database stores a phrase "I'll go" and the user utters "I'll go have a juice drink", the text data "I'll go have a juice drink" contains the phrase "I'll go", and thus the uttered voice determination unit 107 determines that the uttered voice data "I'll go have a juice drink" is the uttered voice data to be notified to the user.

When the stationary state determination unit 103 determines that a predetermined time has elapsed in a state where the user is stationary and the uttered voice determination unit 107 determines that the uttered voice data is the uttered voice data to be notified to the user, the notification control unit 104C notifies the user of contents of the action of the user based on the uttered voice data. In this case, the notification control unit 104C causes the speaker 50 to output the uttered voice data.

Subsequently, the operation of the action notification device 1C in the fourth embodiment will be described.

Figure 10:
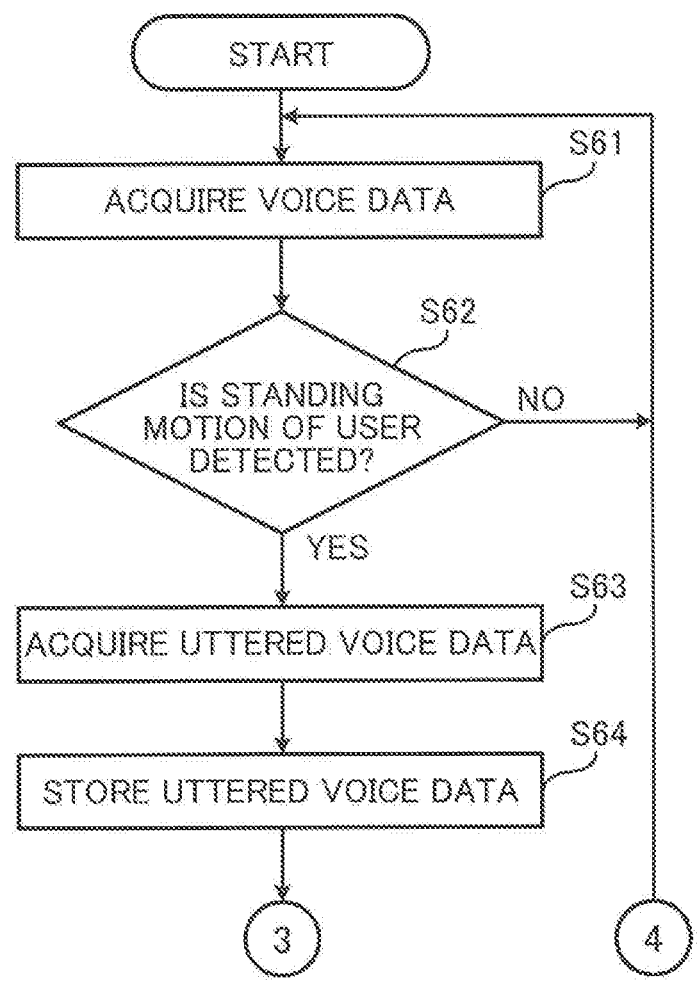
FIG. 10 is a first flowchart for describing an operation of the action notification device in the fourth embodiment.
Figure 11:
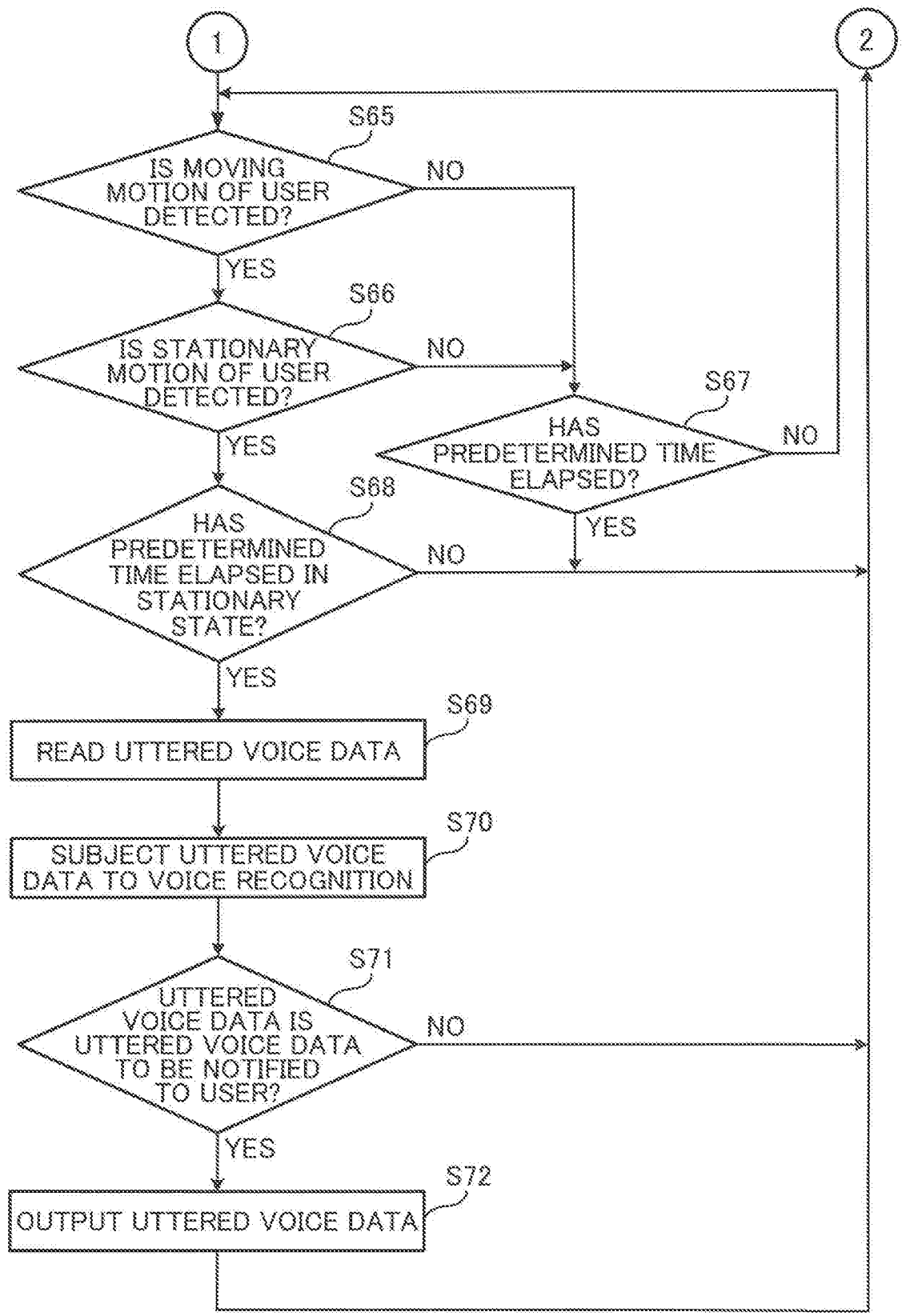
FIG. 11 is a second flowchart for describing the operation of the action notification device in the fourth embodiment.

FIG. 10 is a first flowchart for describing the operation of the action notification device in the fourth embodiment. FIG. 11 is a second flowchart for describing the operation of the action notification device in the fourth embodiment.

First, processing of steps S61 to S68 is the same as processing of steps S1 to S8 shown in FIG. 3, and thus descriptions thereof will be omitted.

When it is determined that the predetermined time has elapsed in a state where the user is stationary (YES in step S68), in step S69, the voice recognition unit 106 reads the uttered voice data from the uttered voice storage unit 203.

Next, in step S70, the voice recognition unit 106 subjects the uttered voice data read from the uttered voice storage unit 203 to voice recognition.

Next, in step S71, the uttered voice determination unit 107 determines whether the uttered voice data subjected to voice recognition by the voice recognition unit 106 is the uttered voice data to be notified to the user. Here, when it is determined that the uttered voice data subjected to voice recognition is not the uttered voice data to be notified to the user (NO in step S71), the process returns to step S61.

On the other hand, when it is determined that the uttered voice data subjected to voice recognition is the uttered voice data to be notified to the user (YES in step S71), in step S72, the notification control unit 104C outputs the uttered voice data from the speaker 50.

In this way, in the fourth embodiment, if the user forgets the action the user has come up with most recently, the user can be reminded of the action and a mental burden on the user can be reduced. Also, in the fourth embodiment, when the uttered voice data acquired with the detection of a predetermined motion of the user acting as a trigger is the uttered voice data to be notified to the user, contents of the action of the user is notified based on the uttered voice data. This makes it possible to prevent unnecessary information from being notified to the user, and to notify the user of only necessary information.

In the fourth embodiment, when it is determined that the predetermined time has elapsed in a state where the user is stationary, the uttered voice data stored in the uttered voice storage unit 203 is subjected to voice recognition, and it is determined whether the uttered voice data subjected to voice recognition is the uttered voice data to be notified to the user. However, the present disclosure is not particularly limited thereto. The acquired uttered voice data may be subjected to voice recognition when the standing motion of the user is detected, and it may be determined whether the uttered voice data subjected to voice recognition is the uttered voice data to be notified to the user. Then, when it is determined that the uttered voice data subjected to voice recognition is the uttered voice data to be notified to the user, the uttered voice data may be stored in the uttered voice storage unit 203. When it is determined that the uttered voice data subjected to voice recognition is not the uttered voice data to be notified to the user, the process may return to step S61.

Also, in the present first to fourth embodiments, the action notification devices 1, 1A, 1B, and 1C are, for example, a smartphone, and include all components, but the present disclosure is not particularly limited thereto. An action notification system may include: a terminal device including the microphone 10, the speaker 50, and the communication unit; a server including the memory 30, the processor 40, 40A, 40B, or 40C, and the communication unit; and a measuring device including the sensor 20 and the communication unit. In this case, the server may be communicably connected to the terminal device and the measuring device. The terminal device is installed in a house of the user and transmits voice data acquired by the microphone 10 to the server. The measuring device is owned by the user and transmits sensing data measured with the sensor 20 to the server. The server transmits the uttered voice data to the terminal device. The terminal device outputs the received uttered voice data from the speaker 50.

In each of the embodiments described above, each component may be implemented with dedicated hardware or by executing a software program suitable for the component. Each component may be implemented by a program execution unit such as a CPU or a processor reading and executing a software program recorded on a recording medium, such as a hard disk or a semiconductor memory.

Part or all of functions of the device according to the embodiments of the present disclosure are typically implemented as a large scale integration (LSI), which is an integrated circuit. These functions may be formed as separate chips, or some or all of the functions may be included in one chip. The circuit integration is not limited to LSI, and may be implemented using a dedicated circuit or a general-purpose processor. A field programmable gate array (FPGA) that is programmable after manufacturing of an LSI or a reconfigurable processor in which connections and settings of circuit cells within the LSI are reconfigurable may be used.

Part or all of functions of the device according to the embodiments of the present disclosure may be implemented by a processor such as a CPU executing a program.

Numerical values used above are merely illustrative to be used to specifically describe the present disclosure, and thus the present disclosure is not limited to the illustrative numerical values.

Order in which steps shown in the flowcharts are executed is merely illustrative to be used to specifically describe the present disclosure, and thus steps may be executed in order other than the above order as long as similar effects are obtained. Some of the steps may be executed simultaneously (in parallel) with other steps.

The information processing method, the information processing device, and the non-transitory computer-readable recording medium recording an information processing program according to the present disclosure are capable of, when the user forgets the action the user has come up with most recently, reminding the user of the action and reducing a mental burden on the user, and thus are useful as an information processing method, an information processing device, and a non-transitory computer-readable recording medium recording an information processing program that notify the user of the action the user has forgotten.

This application is based on Japanese Patent application No. 2018-191600 filed in Japan Patent Office on Oct. 10, 2018, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. An information processing method comprising, by a computer:
acquiring uttered voice data indicating an action of a user and being uttered by the user;
detecting a moving motion of the user;
detecting a stationary motion of the user;
determining whether a predetermined time has elapsed in a state where the user is stationary;
notifying the user of contents of the action of the user based on the uttered voice data when it is determined that the predetermined time has elapsed in the state where the user is stationary;
acquiring ambient voice data;
storing the voice data in a memory; and
detecting a predetermined motion of the user,
wherein the acquiring the uttered voice data includes, when the predetermined motion of the user is detected, extracting, from the voice data stored in the memory, voice data uttered by the user within a predetermined period including a time point at which the predetermined motion of the user is detected as the uttered voice data.

2. The information processing method according to claim 1, wherein the predetermined motion is a standing motion of the user.

3. The information processing method according to claim 1, wherein the predetermined motion is the moving motion of the user.

4. The information processing method according to claim 1, wherein the notifying the user of the contents of the action includes causing a speaker to output the uttered voice data.

5. The information processing method according to claim 1, wherein the notifying the user of the contents of the action includes converting the uttered voice data into text data and causing a display unit to display the converted text data.

6. The information processing method according to claim 1, further comprising determining whether the uttered voice data is uttered voice data to be notified to the user, wherein the notifying the user of the contents of the action includes notifying the user of the contents of the action of the user based on the uttered voice data when it is determined that the predetermined time has elapsed in the state where the user is stationary and when it is determined that the uttered voice data is the uttered voice data to be notified to the user.

7. The information processing method according to claim 1, wherein
   the detecting the moving motion includes detecting the moving motion of the user by using an output waveform from an acceleration sensor, and
   the detecting the stationary motion includes detecting the stationary motion of the user by using the output waveform from the acceleration sensor.

8. An information processing device comprising:
   an acquisition unit configured to acquire uttered voice data indicating an action of a user and being uttered by the user;
   a moving motion detection unit configured to detect a moving motion of the user;
   a stationary motion detection unit configured to detect a stationary motion of the user;
   a determination unit configured to determine whether a predetermined time has elapsed in a state where the user is stationary;
   a notification unit configured to notify the user of contents of the action of the user based on the uttered voice data when it is determined that the predetermined time has elapsed in the state where the user is stationary;
   a microphone configured to acquire ambient voice data;
   a memory configured to store the voice data; and
   a detector configured to detect a predetermined motion of the user,
   wherein the acquisition unit is configured to, when the predetermined motion of the user is detected, extract, from the voice data stored in the memory, voice data uttered by the user within a predetermined period including a time point at which the predetermined motion of the user is detected as the uttered voice data.

9. A non-transitory computer-readable recording medium recording an information processing program for causing a computer to execute:
   acquiring uttered voice data indicating an action of a user and being uttered by the user;
   detecting a moving motion of the user;
   detecting a stationary motion of the user;
   determining whether a predetermined time has elapsed in a state where the user is stationary;
   notifying the user of contents of the action of the user based on the uttered voice data when it is determined that the predetermined time has elapsed in the state where the user is stationary;
   acquiring ambient voice data;
   storing the voice data in a memory; and
   detecting a predetermined motion of the user,
   wherein the acquiring the uttered voice data includes, when the predetermined motion of the user is detected, extracting, from the voice data stored in the memory, voice data uttered by the user within a predetermined period including a time point at which the predetermined motion of the user is detected as the uttered voice data.

* * * * *